(12) United States Patent
Li et al.

(10) Patent No.: US 11,968,152 B2
(45) Date of Patent: Apr. 23, 2024

(54) ANTENNA GROUP OPERATIONS FOR WIRELESS SYSTEMS

(71) Applicant: ZTE Corporation, Guangdong (CN)

(72) Inventors: Yu Ngok Li, Guangdong (CN); Bo Gao, Guangdong (CN); Hao Wu, Guangdong (CN); Shujuan Zhang, Guangdong (CN); Chuangxin Jiang, Guangdong (CN); Huahua Xiao, Guangdong (CN); Yijian Chen, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 515 days.

(21) Appl. No.: 17/265,029

(22) PCT Filed: Aug. 9, 2018

(86) PCT No.: PCT/CN2018/099701
§ 371 (c)(1),
(2) Date: Feb. 1, 2021

(87) PCT Pub. No.: WO2020/029200
PCT Pub. Date: Feb. 13, 2020

(65) Prior Publication Data
US 2021/0314128 A1  Oct. 7, 2021

(51) Int. Cl.
*H04L 5/00* (2006.01)
*H04W 24/10* (2009.01)

(52) U.S. Cl.
CPC ........... *H04L 5/0078* (2013.01); *H04W 24/10* (2013.01)

(58) Field of Classification Search
CPC ......... H04L 5/00; H04L 5/0048; H04L 27/26; H04B 7/06; H04B 7/02; H04B 7/04;
(Continued)

(56) References Cited

U.S. PATENT DOCUMENTS 8,738,056 B2 * 5/2014 Gorokhov ............ H04B 1/7075
455/515
9,253,771 B2 * 2/2016 Miao ..................... H04L 5/0051
(Continued)

FOREIGN PATENT DOCUMENTS

CN  102934382 A  2/2013
CN  106954241 A  7/2017
(Continued)

OTHER PUBLICATIONS

Extended European Search Report for EP18929254 dated Jul. 12, 2021, in English language, 8p.
(Continued)

*Primary Examiner* — Man U Phan
(74) *Attorney, Agent, or Firm* — Crowell & Moring LLP

(57) ABSTRACT

Disclosed are techniques, systems, apparatuses, and methods of wireless communication. In one aspect, a method of wireless communication is disclosed. The method includes transmitting, by a first communications node to a second communications node, a set of information for transmission of reference signals or channels, wherein the set of information includes: timing information related to a transmission timing of the reference signals or channels, timing information related to when an antenna group or a group of reference signals and/or channels related to the antenna group is activated, or an identification of one or more antenna groups associated with the reference signals or channels.

18 Claims, 5 Drawing Sheets

(58) Field of Classification Search
CPC ...... H04B 7/08; H04B 7/0626; H04B 7/0695; H04B 17/336; H04W 24/10; H04W 72/044; H04W 72/12; H04W 72/23; H04W 76/27; H04W 76/28; H04W 8/00; H04W 8/22; H04W 52/42; H04W 52/14; H04W 52/24; H04W 52/36; H04W 52/02; H04W 48/14
USPC .......................................................... 370/252
See application file for complete search history.

(56) References Cited

U.S. PATENT DOCUMENTS

| | | | | |
|---|---|---|---|---|
| 9,337,974 | B2* | 5/2016 | Miao | H04L 5/0051 |
| 9,408,229 | B2* | 8/2016 | Chun | H04W 72/04 |
| 10,080,228 | B2* | 9/2018 | Ouchi | H04W 74/006 |
| 10,149,246 | B2* | 12/2018 | Komati | H04W 72/0446 |
| 10,735,072 | B2* | 8/2020 | Kwak | H04B 7/0456 |
| 10,812,239 | B2* | 10/2020 | Gao | H04B 7/088 |
| 10,855,427 | B2* | 12/2020 | You | H04L 5/0051 |
| 11,102,776 | B2* | 8/2021 | Cui | H04W 56/001 |
| 11,522,274 | B2* | 12/2022 | Hakola | H01Q 1/246 |
| 11,632,758 | B2* | 4/2023 | Cirik | H04L 5/0023 375/267 |
| 11,637,722 | B2* | 4/2023 | Tang | H04B 7/0617 370/329 |
| 2011/0142095 | A1 | 6/2011 | Guo et al. | |
| 2012/0327876 | A1* | 12/2012 | Ouchi | H04W 74/004 370/329 |
| 2013/0078913 | A1 | 3/2013 | Lee et al. | |
| 2015/0282123 | A1 | 10/2015 | Miao et al. | |
| 2015/0282124 | A1 | 10/2015 | Miao et al. | |
| 2018/0212732 | A1 | 7/2018 | You et al. | |
| 2019/0140723 | A1* | 5/2019 | Yum | H04L 5/0082 |
| 2019/0379483 | A1* | 12/2019 | Tang | H04W 4/00 |
| 2022/0140978 | A1* | 5/2022 | Nam | H04W 76/27 370/329 |
| 2022/0239352 | A1* | 7/2022 | Hakola | H04L 5/0091 |
| 2022/0416968 | A1* | 12/2022 | Nam | H04L 5/0053 |

FOREIGN PATENT DOCUMENTS

| | | | |
|---|---|---|---|
| EP | | 2533590 A1 | 12/2012 |
| WO | | 102742343 A | 10/2012 |
| WO | WO 2014/126519 | A1 | 8/2014 |
| WO | WO 2017/128175 | A1 | 8/2017 |
| WO | WO 2018017217 | A1 | 1/2018 |
| WO | WO 2018/039427 | A1 | 3/2018 |
| WO | WO 2018/053359 | A1 | 3/2018 |
| WO | WO 2018/084616 | A1 | 5/2018 |
| WO | WO 2018/131945 | A1 | 7/2018 |

OTHER PUBLICATIONS

First Office Action for Chinese application No. 201880096563.1, dated Feb. 23, 2022, 189, in Chinese language.
Samsung, "Semi-Persistent CSI Reporting and SRS for DRX", 3GPP TSG-RAN WG2 NR AH 1807, R2-1809842, dated Jul. 2-6, 2018, 5p, CA.
Nokia et al., "Measurements for mobility management", 3GPP TSG RAN WG meetinq 90bis, R1-1718616, dated Oct. 9-13, 2017, CZ.
Concise Explanation of Relevance for B9.
International Search Report for PCT/CN2018/099701, dated May 9, 2019, 2p.
Written Opinion of the International Searching Authority for PCT/CN2018/099701, dated May 5, 2019, 4p.
Examination Report for corresponding Canadian application No. 3,107,891, dated Sep. 6, 2023, 5p.

* cited by examiner

ANTENNA GROUP OPERATIONS FOR WIRELESS SYSTEMS

This application is the national phase of International Application No. PCT/CN2018/099701, filed Aug. 9, 2018, the entirety of which is hereby incorporated by reference.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This document discloses methods, systems, and devices related to wireless communication where multiple antenna groups are used.

In one aspect, a wireless communication method is disclosed. The method includes transmitting, by a first communications node to a second communications node, a request for transmission of reference signals, wherein the request includes a whole number value representative of a number of reference signals being requested.

In another aspect, another wireless communication method is disclosed. The method includes transmitting, by a first communications node to a second communications node, a request for transmission of reference signals, wherein the request includes timing information including a first time for transmission of the reference signals, and/or a second time indicating when the first communications node will activate an antenna group or a group of reference signals and/or channels related to the antenna group.

In another aspect, the above-described methods may be implemented by a wireless communication apparatus such as a user equipment or a base station. The apparatus may include a processor configured to implement the above-described methods and other variations described herein.

In yet another example aspect, the above-described methods may be embodied as processor-executable code that is stored on a computer-readable program medium.

The details of one or more implementations are set forth in the accompanying attachments, the drawings, and the description below. Other features will be apparent from the description and drawings, and from the claims.

DETAILED DESCRIPTION

Section headings are used in the present document only to improve readability and do not limit scope of the disclosed embodiments and techniques in each section to only that section.

With the development of wireless communication technologies, the performance including transmission rate, delay, throughput, and reliability has been improved through technologies including high-frequency operation, large bandwidth communications, and multiple antennas. However, to achieve high-performance wireless transmission, user equipment (also referred to as a terminal or UE) must perform more complex processing to meet the performance requirements. For example, a UE that detects a larger control channel bandwidth is subject to more complex control information including data encoding, decoding processing, and the like. A UE that operate at high frequencies may use a large bandwidth to achieve a high data rate or high-capacity transmission. This may use more computational resources which may result in high power consumption. Accordingly, reducing the power consumption at the UE is advantageous to the operation and development of wireless communication.

The next generation of radio access technology (RAT) is not far away. The new RAT will include frequency ranges up to about 100 GHz. High-frequency communications above about 6 GHz suffers from significant path loss and penetration loss. One solution is to deploy large-scale antenna arrays to achieve high beamforming gain in order to compensate for the loss. This may be a practical solution for high frequency systems due to the smaller wavelengths of high-frequency signals. At around 30-70 GHz, up to about 1024 or more transmit beams may be used. When the antenna scale is large, fully exploiting multiple-input multiple-output (MIMO) gain by digital beamforming at baseband may not be realistic due to the hardware cost, power consumption, and standardization complexity. Multi-antenna schemes with analog/hybrid (i.e. analog and digital) beamforming for a new radio (NR) interface should be supported for high frequency communications. The form-factor of a large-scale antenna array may include multiple antenna panels. Each panel may generate multiple directional beams that can be pointed in different directions such as one or more beams that can be steered in different directions.

Figure 1:
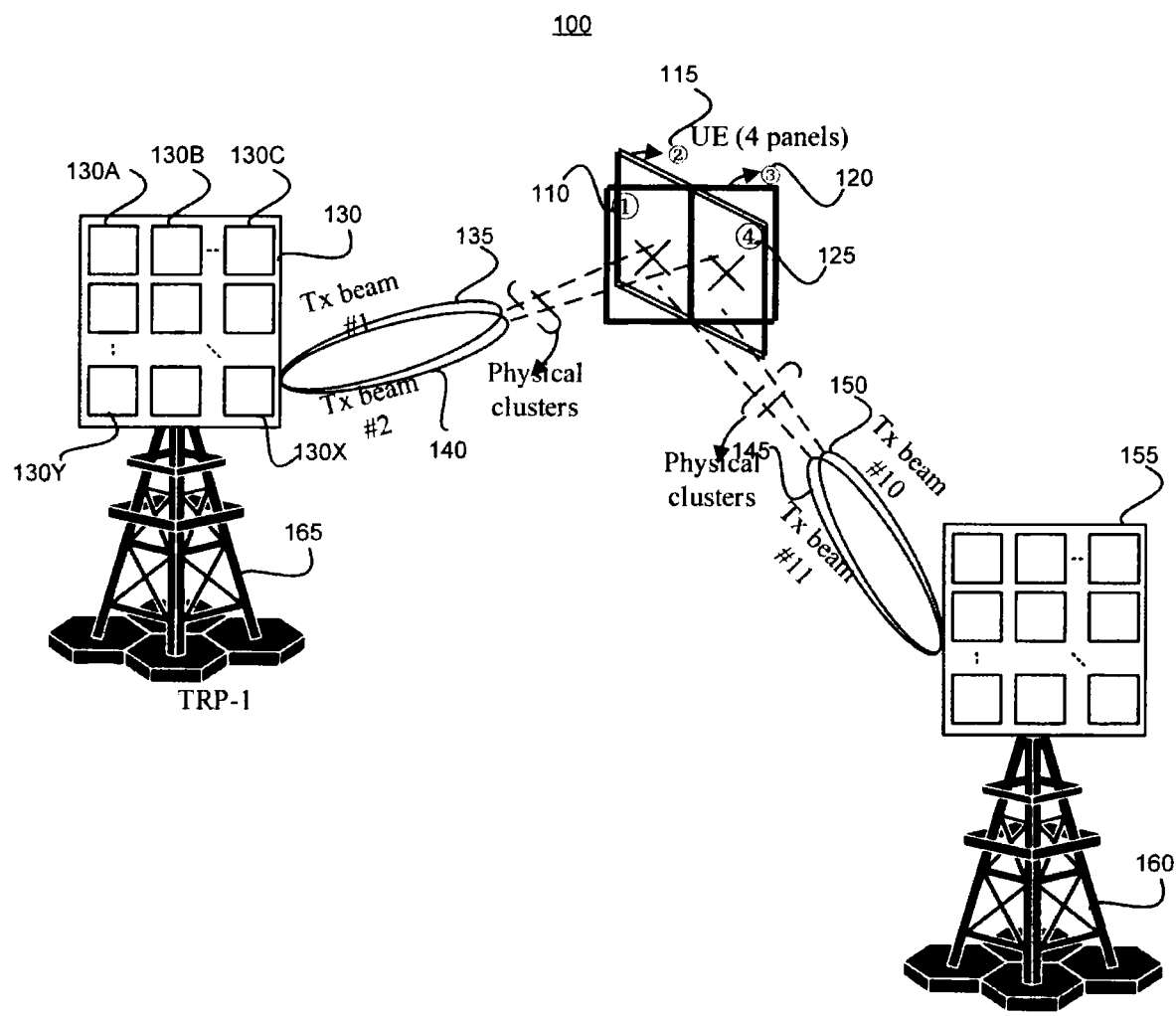
FIG. 1 depicts a system, in accordance with some example embodiments.

In order to ensure multi-beam transmission/reception for diversity and higher throughput, multiple antenna groups including multiple transmit/receive panels may be used. An antenna group refers to an antenna panel, group of transmit/receive units, group of antenna ports, or group of reference signals or a group of beams. For example, FIG. 1 depicts multiple user equipment (UE) panels 110, 115, 120, and 125 which can interoperate with multiple base station panels 130A, 130B, 130C, 130X, 130Y, etc. or groups of panels 130 and 155. One or more antenna beams generated by group of panels 130 may be directed toward one or more of the UE panels 110, 115, 120, and 120. For example, antenna beams 135 and 140 may be directed toward the UE; beam 130 from TRP 165 may be directed toward panel 110 of the UE and/or beam 140 from TRP 165 may be directed toward panel 125 of the UE. Antenna beams 145 and 150 may be directed toward the UE; beam 145 from TRP 160 may be directed toward panel 110 of the UE and/or beam 150 from TRP 160 may be directed toward panel 135 of the UE. Power efficiency may be reduced when multiple antenna groups/panels are powered when they are not being used at the UE (or base station (BS)). To use an antenna group, it must wake-up from a sleep mode which takes time and power to power-up the antenna group for use. For example, some wireless standards do not support a scheme to enable a UE or a next generation Node B (gNB) to efficiently turn on/off or activate/deactivate antenna groups. In some standards, to identify a particular beam, an index of reference signal(s) providing QCL parameters (quasi-co-located channel parameters) is indicated/configured to the UE for beam indication/configuration. However, in some standards the NR lacks coordination between UE and gNB for antenna group activation/deactivation.

Some standards support repetition of channel state information reference signals (CSI-RS) for UEs to perform receive beam sweeping at the UE for downlink beam measurement. For aperiodic CSI-RS triggering with repetition of the CSI-RS, a triggering offset can be configured to indicate a transmission time after the triggering time for a UE to activate an inactive antenna group/panel. A UE requires a longer triggering offset when it is to activate an inactive antenna panel/group for receive beam sweeping. When the UE only receives beam sweeping within an antenna group or if antenna groups are active, then a small triggering offset can be used. Similar to the downlink (base station to UE communications), a UE requires a longer triggering offset if it is to activate an inactive antenna group for the uplink (UE to base station communications) sounding reference signals (SRS) transmission. However, the base station does not know whether the beam sweeping will require activation of inactive antenna group or whether the SRS transmission involves an inactive antenna group.

In addition to aperiodic CSI-RS, the UE can use receive beam sweeping periodically based on a periodic CSI-RS. However, the base station does not know how to configure the periodicity if it does not know whether the UE will switch on/off a panel. For uplink beam management, the UE transmits according to a configuration it receives from a base station. For beams corresponding to inactive panels, the UE does not transmit SRS very often. Similar to the downlink, the base station does not know how to configure the periodicity if it does not know whether the UE would want to switch on/off panel.

To overcome some of the above-noted issues, and other problems, embodiments related to beam/antenna group activation and de-activation are described below.

Triggering Offset Requested/Recommended By UE

Since only the UE has information about whether a panel corresponding to a beam measurement is activated, a base station will have what triggering offset should be used only if the UE informs the base station how much time it requires to prepare for receive beam sweeping. In addition, the number of receive beams will be different if it sweeps through multiple panels. It is beneficial if the UE is allowed to request for a repetition of reference signals for receive beam sweeping after the time indicated by the UE. This allows the UE to try different receive beams in different antenna groups if the quality of the channel is degraded. For example, in the example of FIG. 1, the active panels are panels 110 (panel 1 in FIG. 1) and panel 125 (panel 4). If the UE is to measure beams received by inactive panels such as panel 115 (panel 2) or panel 125 (panel 4), the UE can make a request to a base station or transmission-reception point (TRP) such as TRP 160 or TRP 165 by providing relevant information to the corresponding base station.

For example, the following procedure can be used when a there is channel degradation using a selected receive beam at a UE:

1. The UE requests from the BS a repetition of reference signals for receive beam sweeping. One or more of the following is indicated to the BS:
   a) a number of repetitions, N, of the reference signal. The UE requests the BS to send a repetition of reference signals for receive beam sweeping;
   b) time information indicating when the repetition will start;
   c) time information indicating when the UE will activate an inactive antenna group and/or which antenna group is activated; and/or
   d) information indicating which reference signal to repeat, or which reference signal will serve as quasi co-location (QCL) for the repetition of reference signals.

2. The base station activates the beam group (or group of reference signals) corresponding to the activated antenna group.

3. At least one of the aperiodic report configurations configured by the base station includes parameters with empty configuration information. The empty parameters are replaced with what the UE recommended in the latest UE request. These parameters include one or more of the following:
   a) a triggering offset;
   b) an indication of which reference signal will be repeated or which reference signal will serve as QCL for the repetition of the reference signals;
   c) a number of repetitions, N, of the reference signal;
   d) which one or more antenna groups are used for measurement via antenna group identifiers.
Or base station configures above parameters under the aperiodic triggering configuration.

4. The base station triggers an aperiodic beam reporting and selects the aperiodic report configuration which follows the UE's recommendation. This triggers the repetition of the reference signals with N repetitions and the time offset which satisfies the timing requirement from the UE.

Similar to the downlink, the UE can request or recommend the value of a triggering offset of aperiodic SRS. This process includes:

1. The UE requesting from the BS transmission of SRS for transmit beam sweeping. One or more information below is indicated to the BS:
   a) time information indicating when the transmission of one or more SRS should start;
   b) whether the UE will activate an inactive antenna group and/or which antenna group will be activated;
   c) a number of SRS transmissions without spatial relation info—for transmit beam sweeping, the UE requests to the BS for a number of SRS.

2. The base station activates the beam group (or group of reference signals) corresponding to the activated antenna group.

3. At least one of the aperiodic SRS configurations configured by the base station which has some of parameters with an empty configuration. Those parameters follow what the UE recommends in the latest UE request. These parameters include one of the following:
   a) triggering offset;
   b) number of SRS transmission without spatial relation info;

4. The base station triggers SRS transmission and selects the aperiodic SRS configuration which follows the UE recommendation. This triggers the transmission of SRS with N resources without spatial relation info and the time offset which satisfies the timing requirement from the UE.

Periodicity Requested/Recommended By UE

For the transmission of periodicity signals including periodic CSI-RS/SRS and semi-persistent CSI-RS/SRS, the UE can indicate to the BS the reference signals with configured QCL/spatial relation information corresponding to a beam group should have the minimum value of configured periodicity. The UE can request for a time pattern (including periodicity) of periodic/semi-persistent CSI-RS/SRS and the number of CSI-RS/SRS transmissions/repetitions.

Figure 2:
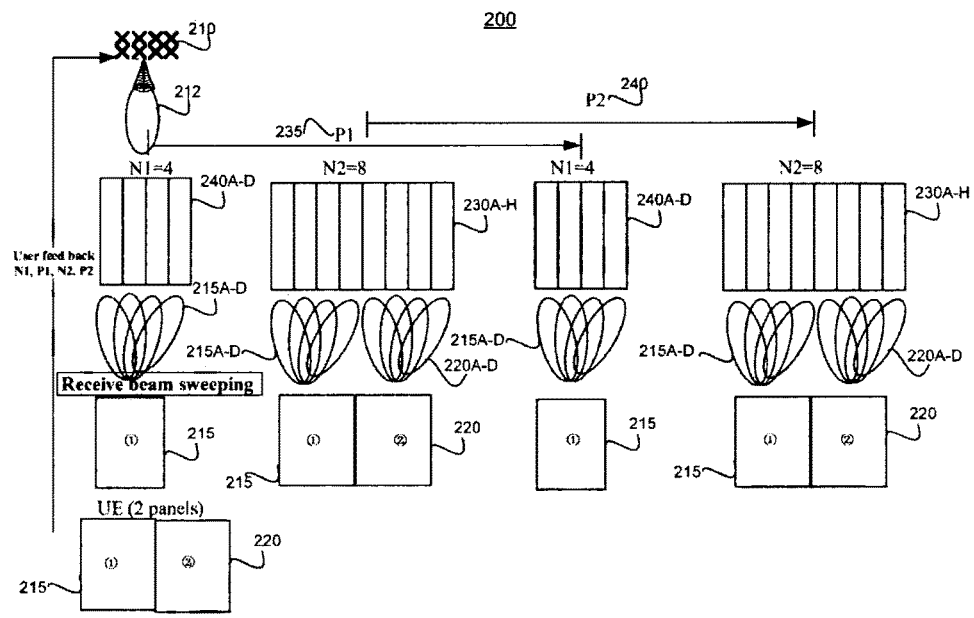
FIG. 2 depicts an example of a user equipment (UE) request for a repetition of channel state information reference signals (CSI-RS) with a periodicity.

FIG. 2 depicts an example of a UE request for a repetition of CSI-RS with a periodicity. For example, the UE can request a number, N1, of repetitions of a CSI-RS resource with periodicity P1 and for a number, N2, repetitions of the same CSI-RS with periodicity P2. In the example of FIG. 2, in response to the request the base station 210 producing beam 212 sends with periodicity P1, N1=4 CSI-RS which the UE sweeps receive beams 215A-D using panel 215 followed by N2=8 repetitions of the same CSI-RS to which the UE sweeps receive beams 215A-D and 220A-D using another panel, panel 220. For a number, N2=8 repetitions of the same CSI-RS with periodicity P2 the base station 210 producing beam 212 sends with periodicity P2, N2=8 CSI-RS which the UE sweeps receive beams 215A-D using panel 215 followed by N2=8 repetitions of the same CSI-RS to which the UE sweeps receive beams 215A-D using panel 215 and 220A-D using panel 220.

Beam Group Activation/Deactivation

Beams or reference signals are grouped corresponding to antenna/beam group. UEs or base stations can activate or deactivate antenna/beam group. All beams corresponding to the same group are activated or deactivated. When a beam group is said to be deactivated, all the beams corresponding to the same group are put in sleep mode or dormant mode. Some details are as follows:

1. The transmission configuration indication (TCI) states or SRS triggering states corresponding to the reference signals which belonged to a deactivated antenna group are de-activated.

2. The antenna group activation or deactivation can be signaled by the base station using media access control (MAC) control element (MAC-CE) or downlink control information (DCI). The activation command activates the TCI states corresponding to the reference signals which belonged to the indicated antenna group after a time offset.

3. The antenna group activation or deactivation can be signaled and/or requested by the UE.

Conditions for de-activation can be defined by, for example, channel quality including SINR or RSRP, or power saving mode or maximum number of layers.

4. Beam/CSI reports can be derived based on activated and de-activated antenna group(s) in a certain time window which can be configured by the base station or requested by a UE. The information of the time window includes the duration, periodicity, the start time and the end time. In the time window, the UE can wake up de-activated antenna group(s) and perform measurement based on antenna group (s) which have been wakened-up.

5. Beam/CSI reports are derived based on the activated antenna group(s) outside the certain time window.

6. Base station can down-select among activated antenna groups for beam/CSI reporting and beam/QCL indication.

The UE can inform the base station the maximum number of activated/active antenna groups the UE can support simultaneously. The maximum number of activated/active antenna groups for measurement can be different in different time slots (e.g. the maximum number of activated/active antenna groups can be larger in the configured time window for measurement). In a power saving mode, the UE may request fewer activated antenna groups.

Figure 3:
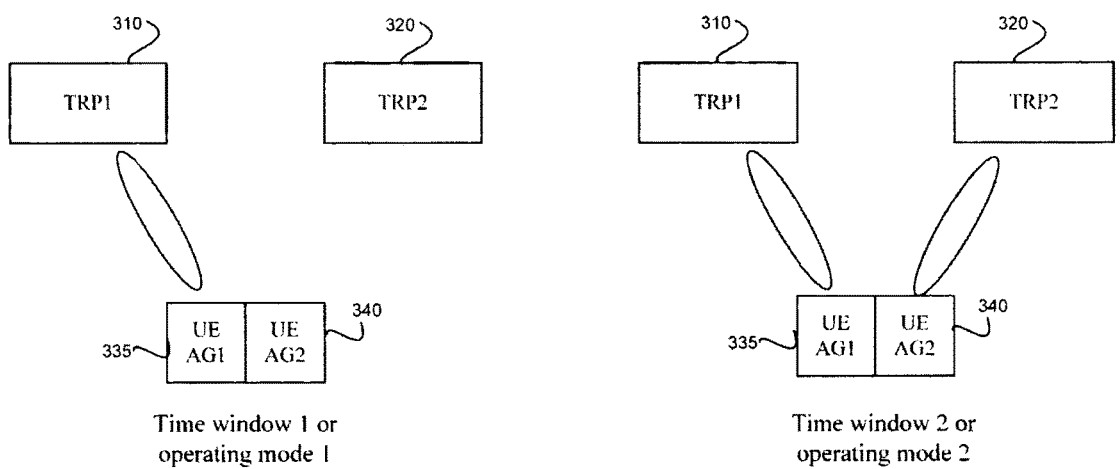
FIG. 3 illustrates an example of a multi-transmission reception point (multi-TRP) transmission where different antenna groups and/or different operating modes are active in a time window.

FIG. 3 illustrates an example of a multi-TRP transmission where different antenna groups are active in a configured time window or different operating modes are active in a configured time window. During a first time window or in a first operating mode, the UE may communicate with TRP1 at 310 via AG1 at 335. During a second time window or in a second operating mode, the UE may communication with TRP1 at 310 via AG1 at 335 and TRP2 at 320 via AG2 at 340.

In some example embodiments, each signal/channel is associated with antenna group ID(s). The association is either configured by the base station or recommended by the UE. By using the ID(s), either the base station or the UE can send an activation command to each other to activate all the signals/channels associated with the ID(s) by MAC-CE or DCI. The activation signaling for activating antenna groups can be also bundled with signaling to activate an operating mode. In some operating modes (e.g., multi-TRP transmission), multiple groups of signals/channels can be configured. Each group of signals/channels signals is associated with an antenna group ID. In some example embodiments, one antenna group ID is not shared by multiple signals/channel groups. For example, signals/channels include at least one of the following: a reference signal, a control channel, a control channel resource set, or a data channel and can be for either downlink or uplink channels or both.

Figure 4:
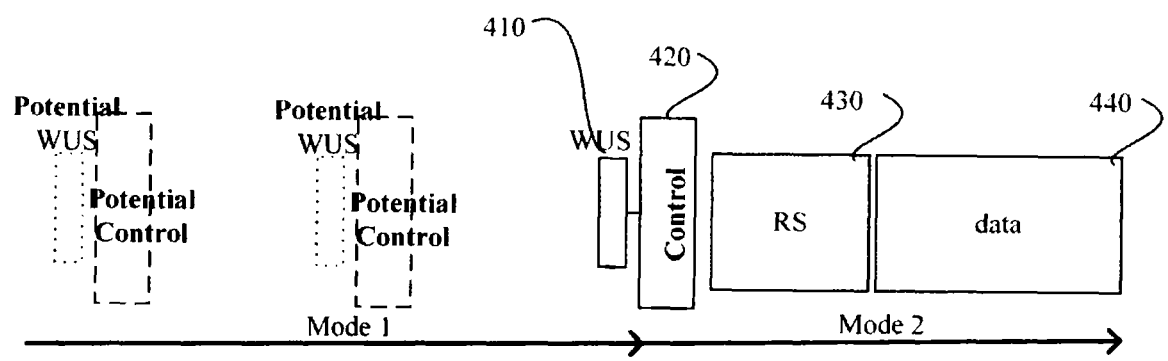
FIG. 4 illustrates an example of a wake-up signal (WUS).

FIG. 4 illustrates an example of a wake-up signal (WUS). The UE monitors for a WUS in time windows configured by the base station. Once a WUS 410 is detected, the UE monitors the control signals 420 for a data transmission 440. Configuration of reference signals 430 is associated with the wake-up signal or control signal following the wake-up signal. When a wake-up signal or a control signal is triggered by a base station to wake up the UE, the UE wakes up from a sleep mode (operating mode 1) to a wake-up mode (operating mode 2) and the corresponding reference signals are transmitted without an additional trigger. The antenna groups used in operating mode 1 can be configured differently from the antenna groups used in operating mode 2. Usually, the number of antenna groups used in operating mode 1 is less than number of antenna groups used in operating mode 2.

Figure 5:
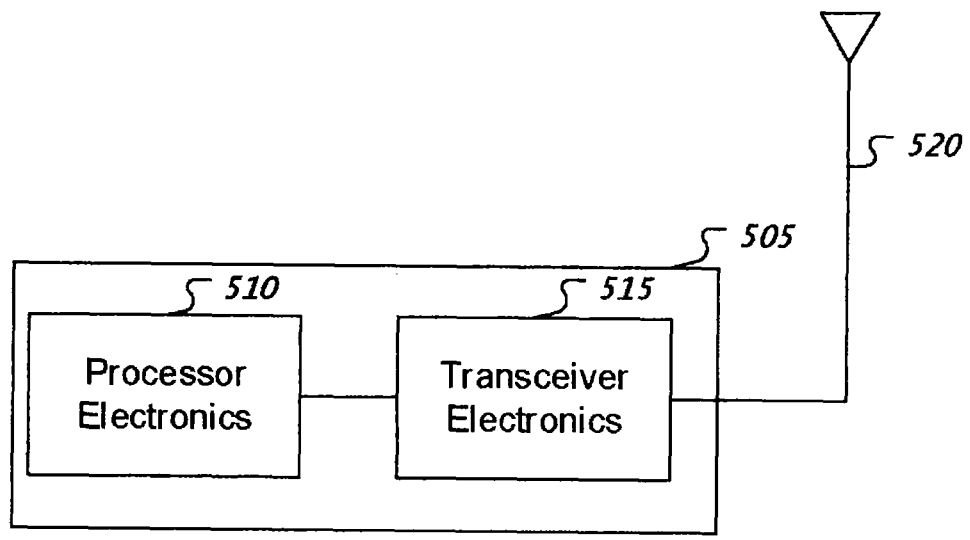
FIG. 5 depicts a block diagram representation of a portion of a radio station.

FIG. 5 depicts a block diagram representing of a portion of a radio station 505. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

Figure 6:
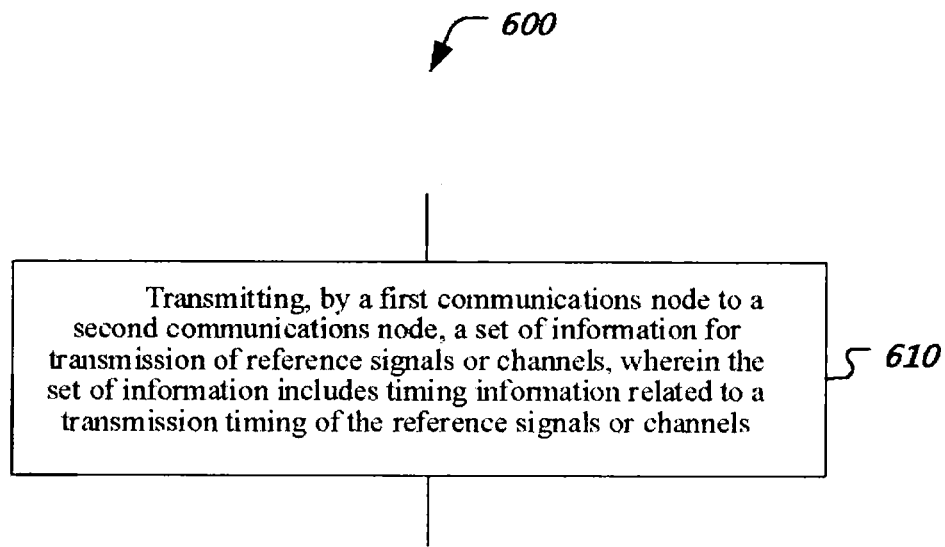
FIG. 6 depicts a flowchart representation of a method for wireless communication.

FIG. 6 is a flowchart representation of a method 600 for wireless communication. At 610, the method includes transmitting, by a first communications node to a second communications node, a set of information for transmission of reference signals or channels, wherein the set of information includes timing information related to a transmission timing of the reference signals or channels.

Figure 7:
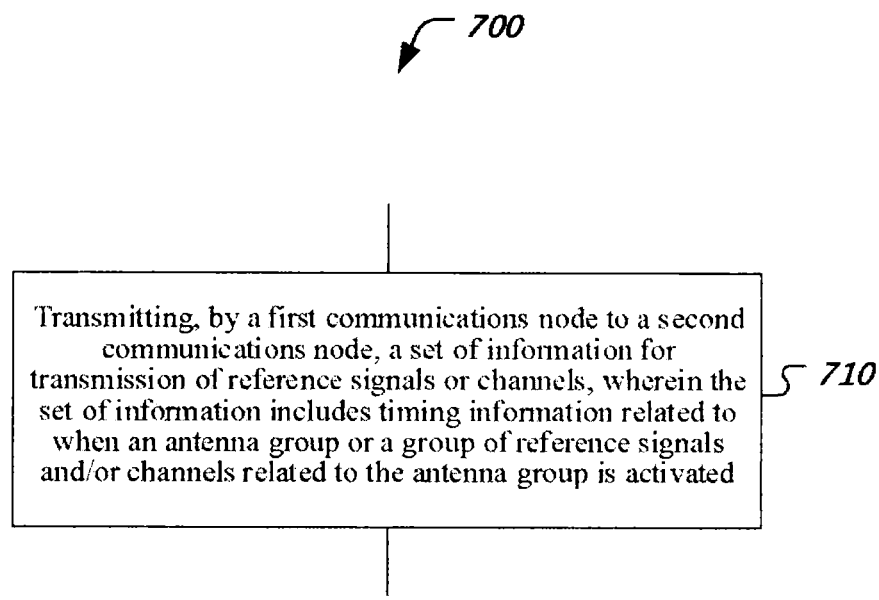
FIG. 7 depicts another flowchart representation of another method for wireless communication.

FIG. 7 is a flowchart representation of a method 700 for wireless communication. At 710, the method includes transmitting, by a first communications node to a second communications node, a set of information for transmission of reference signals or channels, wherein the set of information includes timing information related to when an antenna group or a group of reference signals and/or channels related to the antenna group is activated.

Figure 8:
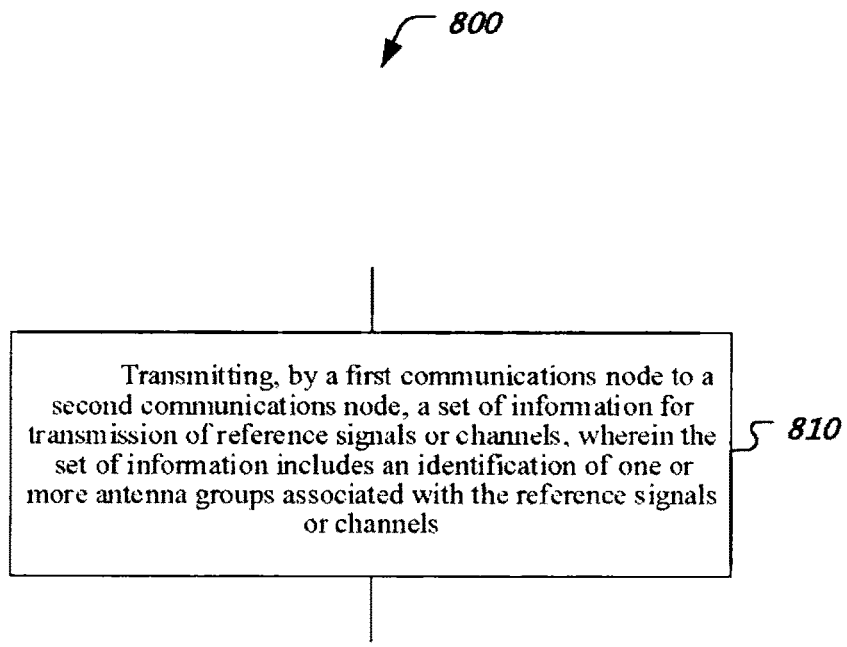
FIG. 8 depicts yet another flowchart representation of another method for wireless communication.

FIG. 8 is yet another flowchart representation of a method 800 for wireless communication. At 810, the method includes transmitting, by a first communications node to a second communications node, a set of information for transmission of reference signals or channels, wherein the set of information includes an identification of one or more antenna groups associated with the reference signals or channel.

The flowcharts shown in FIGS. 6-8 may include any of the features described below. The timing information includes a request for a pattern of reference signals. The request includes an indication of the pattern of reference signals including a whole number value representative of a number of reference signals being requested and/or which one or more of the reference signals are requested to be repeated and/or another indication of which one or more of the reference signals are to provide channel properties information related to the transmission of the reference signals. The pattern includes different repetition rates for at least one of the reference signals. The pattern comprises different repetition rates for different antenna groups used for transmission or measurement of the reference signals. A rate for repetition of the reference signals depends at least in part on a quantity of antenna groups used for transmission or measurement of the reference signals and which one or more of the antenna groups are used. The pattern includes triggering offset times for transmission of the reference signals. The pattern includes different triggering offset times associated with different sets of antenna groups for measurement or transmission of the reference signals. The different triggering offset times are related to time offsets from a first time when the second communications node sends a control signal to cause a triggering of a transmission of reference signals to a second time when the reference signals are transmitted. The transmission pattern comprises a periodicity of transmission of the reference signals. The periodicity of transmission of the reference signals provided is a requested periodicity or a minimum periodicity requested by the first communications node. The transmission pattern comprises different periodicities associated with different sets of antenna groups for transmission or measurement of the reference signals. The transmission pattern includes reference signals with different repetition rates that are transmitted in different periodicities. Included is measuring and/or comparing channel qualities associated with different sets of antenna groups using the reference signals; and/or sending, to the second communications node, one or more results from the comparing and/or measuring. Also included is measuring and/or comparing channel qualities associated with different sets of antenna groups using the reference signals by the second communications node; and sending, to the first communications node, one or more results from the comparing and/or measuring. The result from the measuring and/or comparing includes an identification of one or more sets of antenna groups with higher channel quality than other sets of antenna groups and/or the channel qualities. A first communications node selects a set of antenna groups based on the measurement and reports the selection to a second communications node. The first communications node activates or deactivates a set of antenna groups based on the measurement and informs the second communications node which antenna group is activated or deactivated to the second communications node. The second communications node indicates to the first communications nod which antenna group is activated or selected or deactivated or deselected to the first communications node within a predefined or configured time window. The time window is related to the time after the transmission of the reference signals for measurement or the time after the measurement report sent by the first communications node or the time after the time window for measurement. The activation/selection command is applied to the predefined time window and is maintained valid until next time window for the decision based on next measurement window. The channel qualities include one or more of: a reference signal received power (RSRP); a signal to interference plus noise power (SINR); a reference signal received quality (RSRQ); or a channel quality indicator (CQI). The channels include a control channel or a control channel resource set and an identification of one or more antenna groups associated with the control channel or the control channel resource set. The data channel scheduled by the control channel or the control channel resource set is associated with a same set of the antenna groups as the antenna groups or a subset of the antenna groups associated with the control channel or the control channel resource set. The reference signals are triggered by the control channel or the control channel resource set are associated with the same set of the antenna groups as the antenna groups or subset of the antenna groups associated with the control channel or the control channel resource set. When the set of the antenna groups associated with the data channel or a first reference signal is different from the set of the antenna groups or the control channel resource set, then different timing information is applied to the data channel or reference signal compared to the timing information of the reference signals or the channels. The timing information includes a triggering offset, a scheduling offset, a periodicity or a time window which is configured per antenna group. When the set of antenna groups associated with the data channel or the first reference signal is different from the set of the antenna groups or the control channel resource set, then for the transmission of the data or the reference signal, a longer triggering offset, scheduling offset, or periodicity is used. Each antenna group includes a plurality of antenna beams, each antenna beam providing gain in a different direction. Each antenna group includes an antenna panel, a group of transmit/receive units, a group of antenna ports, a group of reference signals, or a group of beams. The timing information corresponds to a time window in which the reference signals/channels can be transmitted. Different time windows including the time window are used for the reference signals or channels associated with different sets of antenna groups. Different time windows including the time window correspond to different operating modes. The different operating modes correspond to different levels of power consumption or different levels of data transmission capability. The at least one of the different operating modes is configured per a first antenna group or per a set of antenna groups. A control signal to change a first operating mode is indicated per the first antenna group or a set of antenna groups. The different operating modes include: an energy efficient or saving mode; a sleep mode; a radio resource control (RRC) connected mode; a discontinuous reception (DRX) mode; an idle mode; a full data transmission mode; a high data rate mode; a low data rate mode; a higher rank transmission mode; or a lower rank transmission mode. A maximum number of activated antenna groups is different in the different time windows or the different operating modes. A maximum transmission rank is different in the different time windows or the different operating modes. The first communications node reports to the second communications node the information about the maximum transmission rank and/or the maximum number of activated antenna groups in the different time windows or the different operating modes. The second communications node configures the maximum transmission rank and/or the maximum number of activated antenna groups in the different time windows or the different operating modes. The pattern comprises timing information related to a control signal, wherein a configuration of the transmission of reference signals is associated with the control signal, and wherein the control signal includes a wake-up signal or other control signal associated with changing an operating mode of the first communication node. Each of the reference signals or channels are associated with an antenna group identifier. The association of each of the reference signals or channels with the antenna group identifier is configured by the second communications node. The association of each of the reference signals or channels with the group identifier is requested by the first communications node. The first communications node activates or deactivates the antenna group and associated reference signals or channels via the antenna group identifier. The first communications node receives from the second communications node an activation or deactivation request to activate or deactivate the antenna group and associated reference signals or channels via the antenna group identifier. The activation or deactivation of the antenna group depends on one or more of the following: whether the measurement of the reference signals corresponding to the antenna group is lower than a threshold; whether the operating mode is low power mode or low data capability mode; or whether the number of MIMO transmission layers is less than maximum number of antenna groups. The activation or deactivation request is carried by a MAC-CE signal or a DCI signal. The activation or deactivation request is applied to the associated reference signals or channels in an uplink direction and a downlink direction. The transmission of the reference signals or channels is from the first communications node to the second communication node or the transmission of the reference signals or channels is from the second communications node to the first communication node. The first communications node is a user equipment and the second communications node is a base station of a cellular communications system or the first communications node is a base station of a cellular communications system and the second communications node is a user equipment. The process includes receiving, at the first communications node from the second communications node, a response to the request for transmission of reference signals and/or receiving, at the first communications node from the second communications node, the reference signals including the whole number value representative of the number of reference signals.

Figure 9:
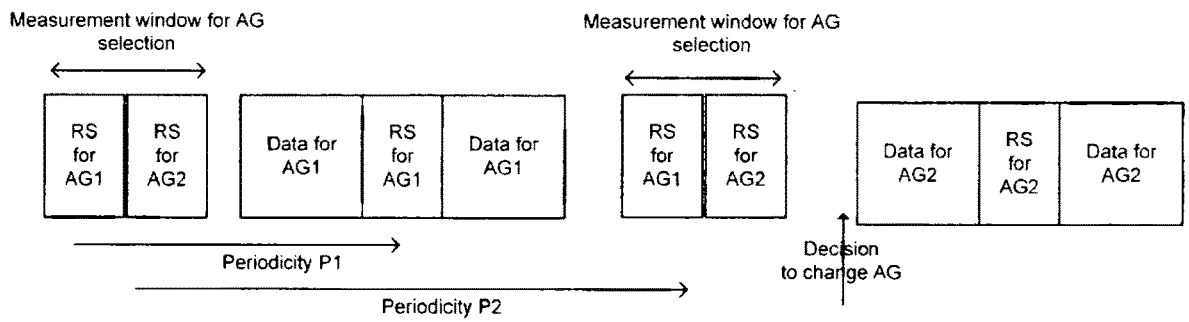
FIG. 9 illustrates reference signals transmitted periodically in measurement windows for an antenna group (AG), in accordance with some example embodiments.

FIG. 9 illustrates reference signals transmitted periodically in periodic measurement windows for an antenna group (AG) selection so that inactive AGs can be periodically awakened for measurements. In the time window after the measurement, a decision is made whether to change the antenna group for the next duration. The decision can be either made by first communications node (UE or base station) and reported to second communications node (base station or UE) or the decision can be made by second communications node based on a measurement report from first communications node. A process includes measuring and/or comparing channel qualities associated with different sets of antenna groups using the reference signal, and sending, to the second communications node, one or more results from the comparing and/or measuring. The result from the comparing may include an identification of one or more sets of antenna groups with higher channel quality than other sets of antenna groups and/or the channel qualities. The first communications node may select a set of antenna groups based on the measurement and report the selection to the second communications node. The first communications node may activate or deactivate a set of antenna groups based on the measurement and report to the second communications node which antenna group is activated or deactivated. The second communications node may activate/select or deactivate/de-select a set of antenna groups and report to the first communications node which antenna group(s) are activated/selected or deactivated/de-selected to the first communications node within a predefined or configured time window. The time window may be related to a time after the transmission of the reference signals for measurement or a time after the measurement report sent by first communications node, or the time after the time window for measurement. An activation/selection command may be applied to the predefined time window and is maintained valid until next time window for the decision based on next measurement window.

The following description summarizes some of the disclosed subject matter.

1. Communication node A (UE) makes a request/recommendation to communication node B (e.g., base station) for transmission of reference signal(s). One or more of the below information is indicated from the communication node A to the communication node B:
  a) number of repetitions N of the reference signal—The node A requests to the node B to transmit the reference signal N times repeatedly.
  b) time information related to when the transmission of the reference signal will start.
  c) time information related to when the node A will activate an inactive antenna group and/or which antenna group is activated after the indicated time.
  d) which reference signal is repeated or which reference signal should serve as reference for obtaining channel information of the reference signals.

2. The node A makes a request/recommendation to the node B for a time pattern (including periodicity) of periodic/semi-persistent reference signal and the number of reference signal transmissions/repetitions.

3. Antenna group of node A is activated/deactivated by node A. The information related to the operation is indicated to the node B. The information includes antenna group index or indexes of the reference signals corresponding to the activated/deactivated antenna group.

4. Antenna group of node A is activated/deactivated by node B. The information related to the operation is indicated to node A. The information includes antenna group index or indexes of the reference signals corresponding to the activated/deactivated antenna group.

5. Node A or Node B follows the following one or more conditions for the activation or de-activation mentioned in points 3 and 4 above.
   a) whether the highest reference signal received power (RSRP) or signal to interference plus noise power (SINR) measurement of the reference signals corresponding to the antenna group is lower than a threshold.
   b) whether the operating mode is a power saving mode or low data capability mode.
   c) whether the maximum number of MIMO transmission layers is less than the maximum number of MIMO transmission layers supported by using the maximum number of antenna groups.

6. Beam/CSI reports can be derived by the node A based on both activated and de-activated antenna group(s) in a time window which is configured by the node B or requested by the node A. The information of the time window includes duration, periodicity, start time and end time of the time window.

In the time window, the node A can wake up de-activated antenna group(s) and perform measurement based on antenna group(s) which have been wakened up.

7. Beam/CSI reports are derived by the node A only based on the activated antenna group(s) outside the time window mentioned in point 5 above.

8. The node A supports different maximum number of activated/active antenna groups which the node A can transmit or receive simultaneously in different time windows or different operation modes.
   a) The maximum number of activated/active antenna groups can be different in different configured time windows.
   b) The maximum number of activated/active antenna groups can be different in different operation modes. Operation modes include power saving mode and MIMO mode with less number of layers.
   c) The maximum number of activated/active antenna groups is indicated by node A to node B.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of wireless communication, comprising:
    transmitting, by a first communications node to a second communications node, a set of information for transmission of reference signals or channels, wherein the set of information includes at least one of:
    first timing information related to a transmission timing of the reference signals or channels; or
    second timing information related to when one or more antenna groups or a group of reference signals and/or channels related to the one or more antenna groups is activated or deactivated;
    wherein at least one of the first or second timing information includes a request for a pattern of reference signals and the pattern of reference signals comprises triggering offset times for transmission of the reference signals, the triggering offset times being related to time offsets from a first time when the second communications node sends a control signal to cause a triggering of a transmission of reference signals to a second time when the reference signals are transmitted.

2. The method of claim 1, wherein the request includes at least one of:
    an indication of the pattern of reference signals including a whole number value representative of a number of reference signals being requested and/or representative of which one or more of the reference signals are requested to be repeated; or
    another indication of which one or more of the reference signals are to provide channel properties information related to the transmission of the reference signals.

3. The method of claim 1, wherein the pattern of reference signals comprises a periodicity of transmission of the reference signals, including a requested periodicity or a minimum periodicity requested by the first communications node.

4. The method of claim 1, further comprising:
    measuring and/or comparing, by at least one of the first and the second communications nodes, channel qualities associated with different sets of the one or more antenna groups using the reference signals transmitted by the other communications node of the first and the second communications nodes than the measuring communications node based on the set of information of the reference signals; and
    sending, to the other communications node of the first and the second communications node than the measuring communications node, one or more results from the comparing and/or measuring.

5. The method of claim 1, wherein the channels include a control channel or a control channel resource set, wherein the one or more identifiers associated with the one or more antenna groups are associated with the control channel or the control channel resource set.

6. The method of claim 5, wherein a first set of data channel or a first set of reference signals configured the control channel or the control channel resource set is associated with a first set of the antenna groups that is the same as the one or more antenna groups or a subset of the one or more antenna groups associated with the control channel or the control channel resource set.

7. The method of claim 6, wherein when a second set of the antenna groups associated with a second set of data channel or a second set of reference signal is different from the first set of the antenna groups associated with the control channel or the control channel resource set, third timing information is applied to the second set of data channel or the second set of reference signal different from fourth timing information of the first set of reference signals or the first set of data channels.

8. The method of claim 7, wherein:
    the third and fourth timing information each includes a triggering offset, a scheduling offset, a periodicity or a time window, which is configured per antenna group; and
    the triggering offset, scheduling offset, or periodicity of the third timing information is longer than that of the fourth timing information.

9. The method of claim 1, wherein
    at least one of the first and second timing information corresponds to a time window in which the reference signals or channels can be transmitted; and
    different time windows including the time window are used for the reference signals or channels associated with different sets of antenna groups.

10. The method of claim 9, further comprising reporting, from the first communications node to the second communications node information, about a maximum transmission rank and/or a maximum number of activated antenna groups for different time windows or different operating modes.

11. The method of claim 1, wherein the pattern of reference signals comprises timing information related to a control signal, wherein a configuration of the transmission of the reference signals is associated with the control signal and the control signal includes a wake-up signal or other control signal associated with changing an operating mode of the first communication node.

12. The method of claim 1, wherein each of the reference signals or channels is associated with one of the one or more identifiers associated with the one or more antenna groups and the association is configured by the second communications node.

13. The method of claim 12, wherein the association of each of the reference signals or channels with the one or more identifiers is requested by the first communications node.

14. The method of claim 1, wherein the transmission of the reference signals or channels is from the second communications node to the first communication node.

15. The method of claim 1, wherein the first communications node is a user equipment and the second communications node is a base station of a cellular communications system.

16. The method of claim 1, comprising:
receiving, at the first communications node from the second communications node, the reference signals, including a whole number value representative of the number of reference signals, in response to the set of information from the first communications node.

17. An apparatus comprising at least one processor and at least one computer-readable program medium in communication with the at least one processor, the apparatus performing the method of claim 1 when the at least one processor executes instructions in the at least one computer readable program medium.

18. A computer-readable program medium having code stored thereupon, the code, when executed, causing a device to perform the method of claim 1.

* * * * *